United States Patent [19]
Steinberg et al.

[11] 3,869,978
[45] Mar. 11, 1975

[54] WASTE COMPACTOR
[75] Inventors: Richard W. Steinberg; Samuel B. McClocklin; Clarence L. Kostelecky, all of Owatonna, Minn.
[73] Assignee: Owatonna Tool Company, Owatonna, Minn.
[22] Filed: May 9, 1973
[21] Appl. No.: 359,198

[52] U.S. Cl................. 100/53, 53/124 B, 141/73, 100/51, 100/100, 100/215, 100/229 A, 100/295, 100/52
[51] Int. Cl...................... B30b 15/30, B30b 15/06
[58] Field of Search......... 100/100, 51, 52, 53, 255, 100/229 R, 229 A, 295, 269 R, 215; 53/124 B; 141/73, 80

[56] References Cited
UNITED STATES PATENTS
2,757,603  8/1956  Wilson et al.................... 100/229
3,691,944  9/1972  Boyd............................. 100/229 A
3,734,006  5/1973  Hennells........................ 100/295
3,747,519  7/1973  Capps et al.................... 100/295

Primary Examiner—Billy J. Wilhite
Attorney, Agent, or Firm—Wegner, Stellman, McCord, Wiles & Wood

[57] ABSTRACT

A waste compactor having a casing with an opening in the front wall thereof with a wheeled cart movable into the casing and holding a container to receive waste material with means for locking the cart to the casing, a loading chute carried by the cart and compacting structure in the casing including a fluid operated movable disc having a downwardly concave contour to have compacting forces acting radially inwardly toward the centerline of the compacting force and exerting a predetermined maximum pressure for a sufficient period of time to impart a "set" to the waste material in the container carried by the cart.

7 Claims, 5 Drawing Figures

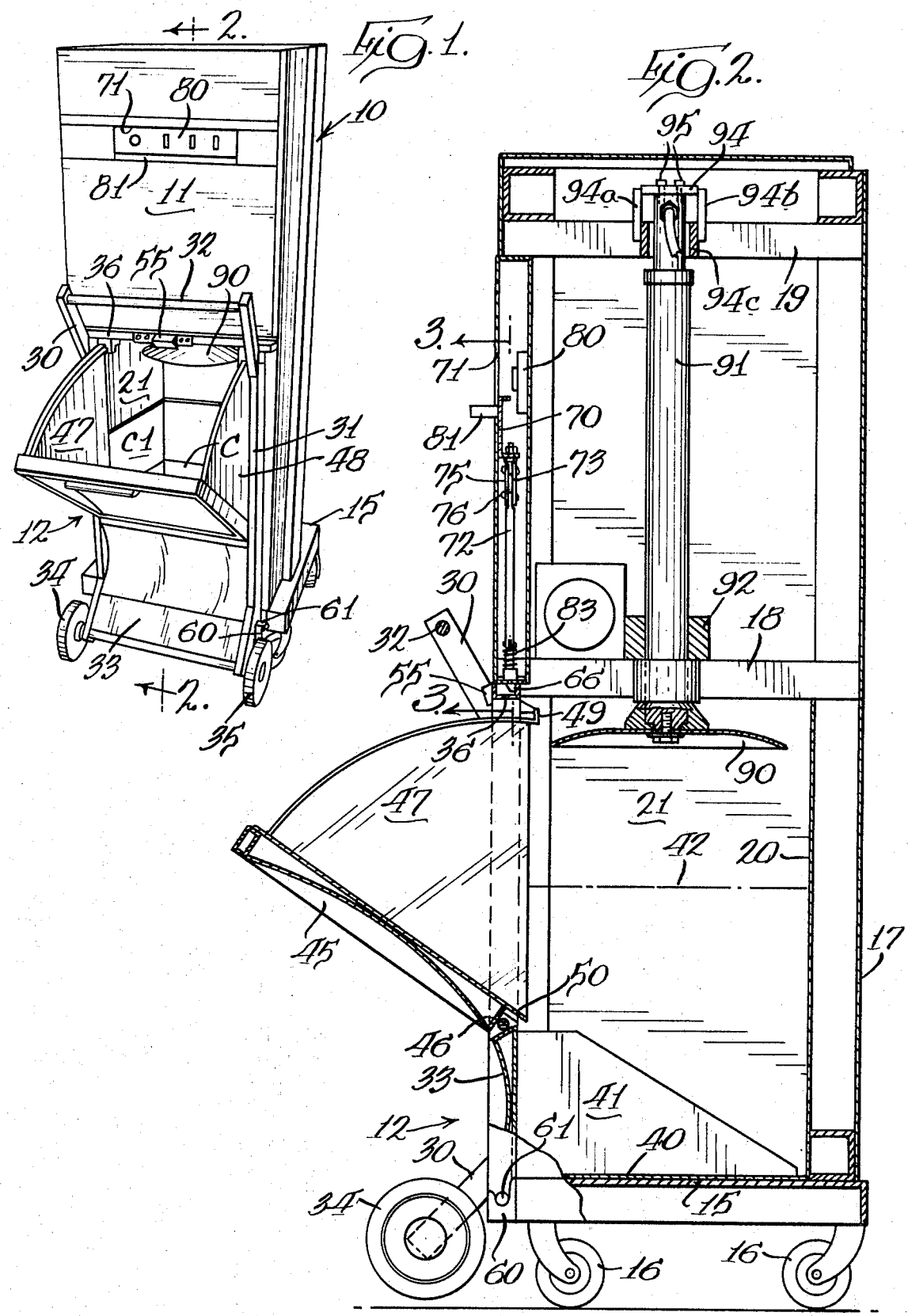

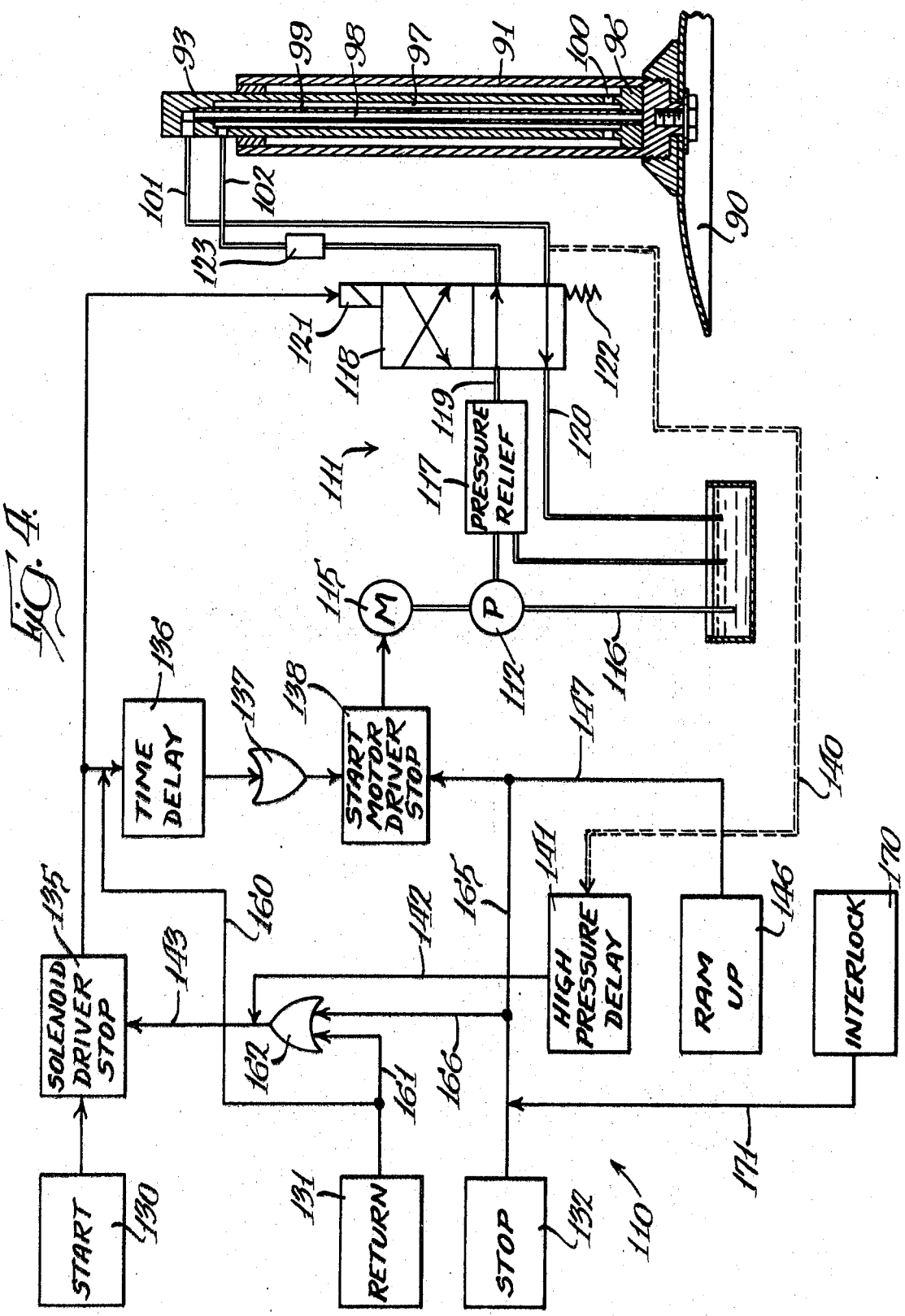

WASTE COMPACTOR

BACKGROUND OF THE INVENTION

This invention pertains to waste compactors having a motor operated compacting member which exerts a predetermined force on the waste material.

In recent years, a large number of waste compactors have come on the market with such devices having either fluid or electric motor driven platens for causing compaction of waste material in a container which is removably held within a casing. Many of these devices having included a cart for holding the container into which the waste material is inserted anc compacted, and with a loading chute associated integrally with a casing which receives the cart.

In such prior art devices, the size of the loading chute is limited, since it is integral with the casing and with the casing still requiring an opening to receive a container or a portable cart carrying the container. Additionally, these devices have required substantial structural strength for the casing which receives the container, with or without a cart, because of the outward component of the forces applied to the material being compacted by the flat platen which is moved downwardly with considerable force against the waste material.

SUMMARY

The waste compactor disclosed herein has a casing with a front wall opening to receive a cart carrying a container to receive the waste material to be compacted. The cart has a loading chute integral therewith, whereby the loading chute may be larger than found in the prior art devices to facilitate loading of waste into the container positioned within the casing. Additionally, the mounting of the loading chute to the cart permits the extension of an inner end of the loading chute to a position overlying the container when the loading chute is opened to make certain that all waste material directed onto the loading chute travels into the container.

The waste container disclosed herein has compacting structure including a downwardly concave disc engageable with the material to be compacted whereby the material being compacted under the disc has movement and force applied thereto in a radially inward direction toward the centerline of the compacting force with a resultant reduction in the stress areas of the container holding the waste material and a lighter structural design of the compactor casing because of the lack of lateral outward forces. Also the compacted volume of waste material is of variable density with the highest density of compacted material at the centerline of the applied force and with lesser density progressively outward to the maximum radial dimension of the compacted material from the centerline of compacting force. Further the downwardly concave disc is carried by the cylinder of a fluid motor with the piston rod thereof secured at its upper end whereby only the concave disc and cylinder are exposed to the waste material with the piston rod not being so exposed to minimize the exposure of the piston rod to dirt and waste material.

The compactor has electrical and hydraulic controls providing for safe manual operation of the compactor and with provision for applying a predetermined force against the waste material for a period of time to obtain a "set" to the compacted material before elevating the concave disc.

A primary object of the invention is to provide a waste compactor having new and improved results, with one or more of the unique structural features set forth above.

BRIEF DESCRIPTION OF THE DRAWINGS

FIG. 1 is a perspective elevational view of the waste compactor with a cart associated therewith and having the loading chute in open loading position;

FIG. 2 is a vertical section on an enlarged scale of the waste compactor and taken generally along the line 2—2 in FIG. 1;

FIG. 4 is a schematic of the hydraulic operating circuit and the electrical control circuit for the compactor.

DESCRIPTION OF THE PREFERRED EMBODIMENTS

Figure 3:
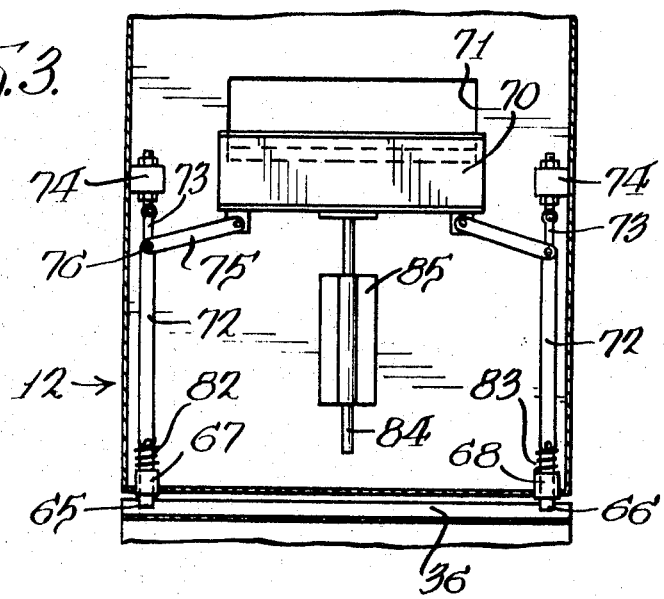
FIG. 3 is a fragmentary vertical section, taken generally along the line 3—3 in FIG. 2.

The waste compactor, as shown generally in FIGS. 1 and 2, has a casing, indicated generally at 10, with a plurality of exterior walls including a front wall 11 having an opening in approximately the lower half thereof to receive a portable cart, indicated generally at 12. The casing 10 includes a base plate 15 supporting a plurality of wheels 16 to provide mobility for the waste compactor. An enclosing rear wall 17 extends upwardly for the height of the casing. An intermediate frame member 18 spans the interior of the casing and is spaced from an upper frame member 19 similarly spanning the casing.

A compacting chamber is provided within the casing at a location beneath the frame member 18 and includes an interior rear wall 20 along with a pair of interior side walls in spaced-apart relation with one of these side walls being indicated at 21. The opening in the casing front wall 11 is approximately of the same height as the compacting chamber in the casing to receive the cart 12. The cart has a pair of spaced-apart similarly shaped frame members 30 and 31 which are spanned at their upper ends by a handle 32 and at their lower ends by a panel 33. The lower ends of the frame members 30 and 31 carry a pair of wheels 34 and 35, respectively, providing for cart mobility.

The cart frame members 30 and 31 are additionally spanned by an upturned, generally U-shaped channel member 36 which, as shown in FIG. 2, fits immediately under the lower edge of the front wall 11 of the casing when the cart 12 is in the casing.

The cart 12 has a bottom panel 40, with a pair of upstanding side walls at the sides of the cart, with one of these side walls being shown at 41 to receive a container C, such as a cardboard box, for the waste material. This box may have closing flaps and when positioned within the compactor the container would be open with the flaps extending upwardly and with the upper level of an extended flap C-1 being indicated by the broken line 42.

The cart 12 also has a loading chute extending for substantially the entire width thereof and equal to approximately one-half the height of the cart. This loading chute has a front door 45 which is hinged, as indicated at 46, to the cart frame members 30 and 31 and which has a pair of side panels 47 and 48 with a convexly curved upper surface and each terminating in an upturned end to limit the outward movement of the loading chute. The upturned end for the side panel 47 is shown at 49 in FIG. 2, and abuts against a surface at the rear of the U-shaped channel 36 of the cart. The loading chute door 45 has a lower inner end 50 extending beyond the pivot axis for the door defined by the pivot connections 46 whereby the lower end 50 overlies the container held by the cart to assure delivery of all waste material directed onto the loading chute into the container. A gravity-type latch 55 carried by the U-shaped channel member 36 functions to hold the loading chute door 45 in closed position.

The cart 12 is locked in position to the casing of the waste compactor by structure including a pair of pivot hooks positioned one at each front lower corner of the casing, with one hook being shown at 60 in FIGS. 1 and 2. These hooks are upwardly open and define pivot blocks whereby a cart, which is tilted slightly counterclockwise from the position shown in FIG. 2 will be resting on the wheels 34 and 35 and can be moved into the compactor casing to bring a pair of pins carried one on each of the cart frame members 30 and 31 into positions overlying the hooks 60. The pin associated with the cart frame member 31 is shown at 61. The cart is then pivoted clockwise about the pivot block hooks 60 into fully-seated position in the casing and with the wheels 34 and 35 raised above the floor. Withdrawal of the cart is accomplished by reversal of the foregoing movements.

With the cart 12 positioned as shown in FIG. 2, it is then securely locked to the casing by a pair of lock pawls 65 and 66 (FIGS. 2 and 3) which are carried by a pair of casing mounted bearing members 67 and 68 for extension downwardly through the lower edge of the front wall 11 of the casing. These locking pawls engage behind a flange of the U-shaped channel 36 of the cart 12, as shown in FIGS. 2 and 3, to securely lock the cart to the casing. These pawls 65 and 66 are operated by means of a movable panel 70 which coacts with an opening 71 in the front wall 11 of the compactor casing. When the front panel 70 is lowered, the lock pawls 65 and 66 are extended. This action is accomplished by a pair of toggle linkages including pivotally interconnected links 72 and 73 for the lock pawl 65 with the link 73 being pivotally connected to a support 74 within the casing. An actuating link 75 extends between the movable panel 70 and the pivot interconnection 76 between the links 72 and 73. A corresponding link structure is provided for the lock pawl 66. With the front panel 70 shown lowered in FIG. 3, the lock pawls are extended and, when the front panel 70 is raised, the toggle links are broken to raise the lock pawls 65 and 66. The operation of the lock pawls by the front panel 70 is a safety feature in that the front panel 70, in closing the opening 71 in the front wall of the casing, blocks access to a control panel 80 for the compactor, as shown in FIG. 2. The locking of the cart to the casing by lowering of the front panel 70 assures that the cart is in locked position before an operator can have access to the control panel 80. Movement of the front panel 70 is facilitated by an outwardly extending handle 81 and the front panel 70 is held in upper position to close the opening 71 by a pair of compression springs 82 and 83 associated one with each of the lock pawls 65 and 66 and acting between the bearing members 67 and 68 and the pivot pin at the lower end of links 72. A guide rod 84 extends downwardly from the front panel 70 and is guided in a housing 85 secured to the interior of the front wall 11 of the compactor.

The compaction of waste material delivered into a container in the cart 12 is obtained by lowering of a downwardly concave disc 90 which is shown in section in FIGS. 2 and 4. The disc is carried at the lower end of a cylinder 91 of a hydraulic motor, with the cylinder guided in a spider 92 supported by the transverse frame member 18. A piston rod 93 extends upwardly out from the cylinder 91 and is held against movement with respect to the transverse frame member by having the upper end thereof attached to a block 94 by a pair of cap screws 95. The block 94 is part of a welded bridge structure including vertical members 94a and 94b which are welded to members 94c spanning the spaced bars of the upper frame member 19. The construction of the cylinder 91 is shown in detail in FIG. 4, wherein the piston rod 93 has a piston 96 at its lower end with the rod having a pair of internal fluid channels 97 and 98 with these channels being provided by a bore within the piston rod and a tube 99 within the bore. The tube 99 extends through the piston 96 to deliver fluid to the underside of the piston 96 while the channel 97 communicates with the space above the piston 96 through a plurality of lateral openings 100. The downwardly concave disc 90 and the cylinder 91 are caused to move downwardly to compact waste material when fluid under pressure is supplied to a line 101 leading to the tube 99 defining the fluid channel 98. The cylinder and concave disc 90 are caused to move upwardly when fluid under pressure is supplied to a line 102 communicating with the fluid channel 97 which, in passing through the openings 100, acts upon the upper end of the cylinder 91. With this construction, the piston rod 93 is remote from waste material and dirt whereby continued reliable operation of the piston and cylinder is assured.

The downwardly concave compacting disc functions to consolidate the waste material toward the centerline of the compacting force. The material is compacted under the radially concave section to have the forces acting radially inwardly toward the centerline of the compacting force. This functions to reduce the stress areas in the container for the waste material as well as permitting a lighter structural design of the casing structure defining the compacting chamber because of the lack of lateral outward forces and gives a variable density of the compacted material with the highest density at the centerline of the compacting force and with the density decreasing outwardly away from the centerline of the compacting force.

The supply of fluid under pressure to either of the lines 101 or 102 is under the control of an electrical control circuit, indicated generally at 110 in FIG. 4, which controls a hydraulic circuit, indicated generally at 111 in FIG. 4. The hydraulic circuit includes a pump 112 driven from a motor 115 with the pump inlet connected to tank through a line 116 and the pump outlet flowing through a pressure relief valve 117 to a solenoid-operated four-way valve 118. Pressure flows to the valve through a line 119 with a tank port connection connected to tank through a line 120. With the solenoid 121 deenergized and with the pump 112 operating, a spring 122 positions the valve 118 in the position shown in FIG. 4 wherein pressure fluid passes to line 102 to lift the cylinder 91 and the concave compacting disc 90. Energization of the solenoid 121 shifts the valve 118 to change the connections with pressure fluid passing to line 101 to lower the cylinder 91 and the concave compacting disc. Upon deenergization of the solenoid, the spring 122 returns the valve 118 to the position shown for lifting or maintaining the cylinder 91 in the elevated position.

The cylinder will descend to various levels, dependent on the waste level in the container. The level is controlled by the detected pressure in the hydraulic circuit. A suitable valve 123, such as a holding valve, holds the cylinder 91 in the upper position when inactive.

The electrical control circuit 110 includes three manual switches located in the control unit 80 at the front of the compactor casing including a start switch 130, a return switch 131 and a stop switch 132. With the cart 12 in position and the loading door 45 locked, operation of the start switch 130 sends a signal to the solenoid driver 135 which pulls in the solenoid valve 121. At this time, pump motor 115 has not started, therefore there is no flow of fluid through the valve 118. A time delay circuit 136 also receives the signal from the solenoid driver and after a short delay sends a signal through an OR gate 137 which actuates the motor driver 138 to start the motor 115 for the pump 112. This causes lowering of the cylinder 91 and the concave compacting disc 90 and waste material is compacted until the pressure builds up to a predetermined level as detected by a signal taken from the flow line 101 through a control line 140 which applies the high pressure signal to a high pressure detecting and time delay unit 141. The delay unit 141 provides a sufficient holding time of the high pressure applied to the waste material to squeeze some "set" into the waste material. It has been found that a 5 second delay will accomplish this purpose. After the predetermined time delay, a signal is emitted from the time delay unit 141 to pass by control leads 142 and 143 to the solenoid driver 135 and cause deenergization of the solenoid. The deenergization of the solenoid 121 results in shift of the valve 118 back to the position shown in FIG. 4 and the cylinder 91 is raised. Return of the cylinder 91 to raised position is detected by a detecting unit 146 which sends a signal through control lead 147 to the motor driver unit 138 to cause stopping of the motor 115.

The manually operated return switch 131, may be operated at any time including during a cycle and sends a signal through control lead 160 to cause starting of the motor 115 for the fluid pump if the motor has not been operating and also sends a signal through a control lead 161 to an OR gate 162 which controls the solenoid driver 135 to deenergize the solenoid 121 whereby the cylinder 91 will be caused to elevate. The operation of the stop switch 132, at any time during the cycle of operation, sends a signal through the control lead 165 to cause the motor driver unit 138 to stop the motor 115 for the pump and also sends a signal through the control lead 166 to the OR gate 162 to the solenoid driver unit 135 to deenergize the solenoid 121 with the result that the cylinder 91 will stop immediately.

An additional control feature is an interlock unit 170 which includes a detection switch on the casing 10 to detect that the cart 12 is in position in the casing of the comparator and that the loading chute is closed. If the cart is not in position or the loading chute is open, the signal is sent by the interlock unit 170 through a control lead 171 to the leads 165 and 166 whereby the motor 115 is stopped and the solenoid 121 is deenergized.

Figure 5:
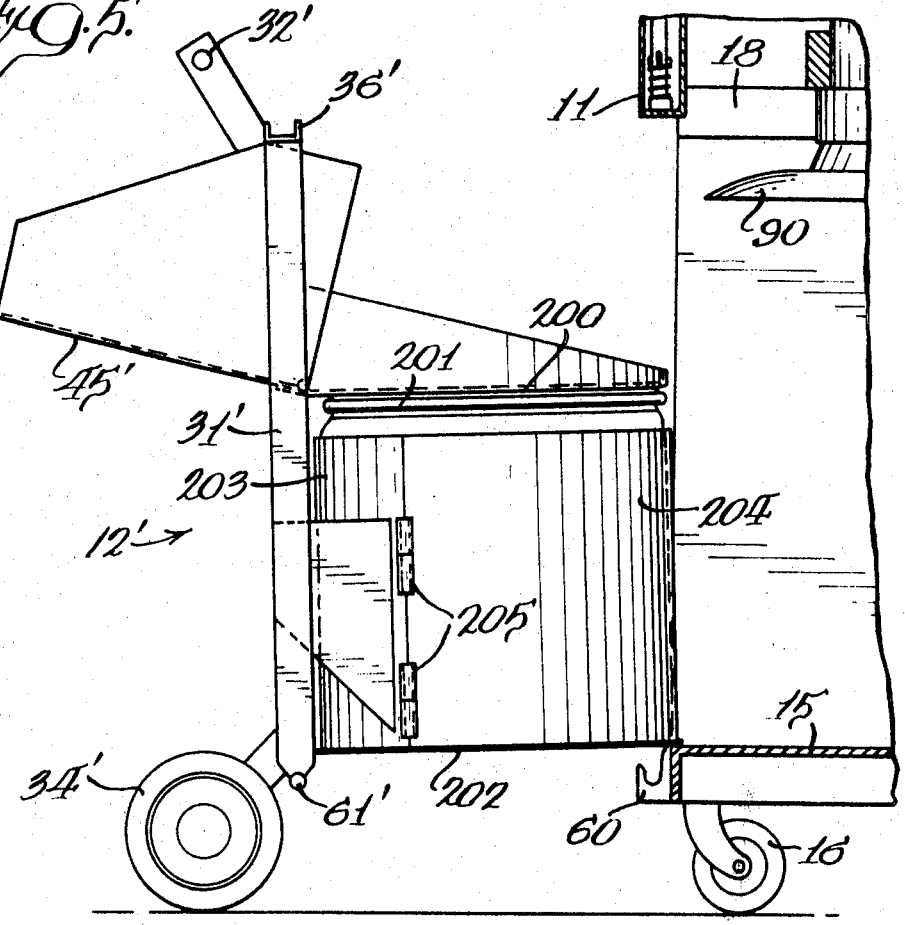
FIG. 5 is a fragmentary view, similar to FIG. 2, showing an alternate embodiment of cart for use in the waste compactor.

An alternate form of cart is shown in association with a comparator in FIG. 5, with the cart being generally the same construction as that shown in the other Figures. The same structural parts have been given the same reference numerals with a prime affixed thereto.

The cart 12' is constructed for supporting a container, such as a plastic bag, with a loading chute having a door 45' leading to an internal frame 200 generally cylindrical in plan, and provided with an external groove whereby an elastic band 201 can hold the upper rim of the plastic bag in position with the base of the bag resting on a bottom panel 202. The vertical height of the bag is supported by a cylindrical wall extending up from the base panel 202, including a fixed wall section 203 and a hinged wall section 204 hinged at 205 which may be pivoted out of the way to permit lateral withdrawal of a filled bag after removal of the cart from the compactor casing. Alternatively, the parts on cart 12' may be shaped to hold a rectangular bag or other container.

We claim:

1. A compactor including a separable wheeled cart, a casing with a front wall having an opening to receive said cart, means to removably lock said cart to said casing, said cart having a front wall which closes off said opening when the cart is in locked position, means on said cart to hold a container for receiving material to be compacted, said cart front wall being defined at least in part by a loading chute mounted for pivotal movement relative to the remainder of the cart, and compacting means within the casing including a smooth surfaced downwardly concave disc and means including a fluid motor for lowering said disc against material in the container to exert forces acting downwardly and inwardly on all of said material immediately beneath said disc.

2. A compactor as defined in claim 1 wherein said loading chute is mounted for pivotal movement about a generally horizontal axis and with a lower end of said chute extending beyond said axis to overlie said container and assure delivery of all material into the container.

3. A compactor as defined in claim 1 wherein said means to removably lock the cart include a pair of hooks at the lower end of the casing, a pair of pins on the cart engageable in said hooks, and latch means carried on the casing to engage the upper end of said cart and hold said hooks and pins in engagement.

4. A compactor as defined in claim 3 wherein the wheels of said cart are offset and at a level beneath said pins whereby said cart may be tilted at an angle as it is moved into said casing on said wheels to move said pins to a position overlying said hooks and then the cart is placed in upright position to lower said pins into engagement with said hooks.

5. A compactor as defined in claim 1 including an electrical control circuit with a plurality of manually operated control buttons, said casing having a movable panel covering said control buttons, latch means on the casing for latching the cart to the casing, and said latch means being operatively connected to said movable panel whereby a cart is locked in place when said control buttons are exposed.

6. A compactor including a casing with a front wall having an opening to receive a cart, a cart having transport wheels and completely separable from the casing, means to removably lock said cart to said casing including a pair of hooks at the lower end of the casing, a pair of pins on the cart engageable in said hooks, and latch means carried on the casing to engage the upper end of said cart and hold said hooks and pins in engagement, said cart having a front wall which closes off said opening when the cart is in locked position, means on said cart to hold a container for receiving material to be compacted, said cart front wall being defined at least in part by a loading chute mounted for pivotal movement relative to the remainder of the cart, and compacting means within the casing including a smooth surfaced downwardly concave disc, and means including a fluid motor for lowering said disc against material in the container to exert forces acting downwardly and inwardly on said material.

7. A compactor as defined in claim 6 including an electrical control circuit with a plurality of manually operated control buttons, said casing having a movable panel covering said control buttons, and said latch means being operatively connected to said movable panel whereby a cart is locked in place when said control buttons are exposed.

* * * * *